O. C. CURRIE.
FEEDING DEVICE FOR SHEETS, ENVELOPS, AND THE LIKE.
APPLICATION FILED APR. 4, 1917.

1,373,869.

Patented Apr. 5, 1921.
7 SHEETS—SHEET 1.

Fig. 1.

Inventor
OTIS C. CURRIE

Witness

By
Attorney

UNITED STATES PATENT OFFICE.

OTIS C. CURRIE, OF DETROIT, MICHIGAN, ASSIGNOR TO WILLIAM O. ALBIG, OF ADRIAN, MICHIGAN.

FEEDING DEVICE FOR SHEETS, ENVELOPS, AND THE LIKE.

1,373,869.

Specification of Letters Patent.   Patented Apr. 5, 1921.

Application filed April 4, 1917. Serial No. 159,725.

*To all whom it may concern:*

Be it known that I, OTIS C. CURRIE, a citizen of the United States, residing at Detroit, county of Wayne, State of Michigan, have invented a certain new and useful improvement in Feeding Devices for Sheets, Envelops, and the like, and declare the following to be a full, clear, and exact description of the same, such as will enable others skilled in the art to which it pertains to make and use the same, reference being had to the accompanying drawings, which form a part of this specification.

This invention relates to feeding mechanism for sheets, envelops and the like, and its object is a mechanism feeding sheets or envelops singly to a feeding table, and a particular object of the invention is a mechanism whereby a single sheet only at a time may be separated from a stack and delivered to a receiving table or other mechanism as may be desired.

In the embodiment of the invention herein disclosed the apparatus is adapted to supply envelops or sheets to a folding machine described particularly in my pending application (Serial Number 120,705), filed September 18, 1916. As described in said pending application, the sheets or envelops are fed alternately from opposite ends of a table to a central folding mechanism and the feeding mechanism is exactly similar at each end of the table, the two feed devices operating alternately. Another object of the invention is a mechanism for separating a sheet or envelop from a stack by means of a vacuum and delivering the end of the separated sheet from two feed rollers which in turn deliver it to the feed table, the vacuum being broken at the time the envelop is taken up by the feed rollers.

These and other objects and the several novel features of the invention in its preferred form are hereinafter more fully described and claimed and shown in the accompanying drawings in which—

Similar characters refer to similar parts throughout the drawing and specification.

The mechanism for folding the sheets or envelops is fully described in the said pending application (Serial Number 120,705), and the description thereof is, therefore, not given in particular herein but involves what I have termed feed tables 1 and 2 on opposite sides of a receiving chamber 3 into which the sheets or envelops are folded. Each table is provided with a similar sheet carrying belt 4 running over the pulleys 5 and 6 and across the upper surface of the feed tables and on this belt rests the idler rollers 7 beneath which the sheets or envelops are inserted from the stack and carried by the belt 4 to the receiving chamber 3. The mechanism for removing a sheet or envelop from the stack and delivering it to the feed tables and belt consists of a pivoted hollow arm 8 terminating at its free end in an apertured plate 9, the opening therein being in communication with a channel in the arm, as will be understood from Fig. 6. The arm is mounted on a rock shaft 10 having a channel therein communicating with the channel in the arm 8 and the end of the shaft is connected to a flexible tube 11 communicating with the lower end of an exhaust pump 12, as will be understood from Fig. 2. The shaft 10 is supported in brackets 13 at each end of the machine as will be understood from Figs. 1 and 4, and this shaft 10 extends toward the rear of the machine as may be seen in Fig. 1, and is provided with a bifurcated rock arm 14 which is engaged by a roller 15 carried by a rock arm 16 conveniently mounted on a shaft 17 extending across the end of the machine.

Figure 1:
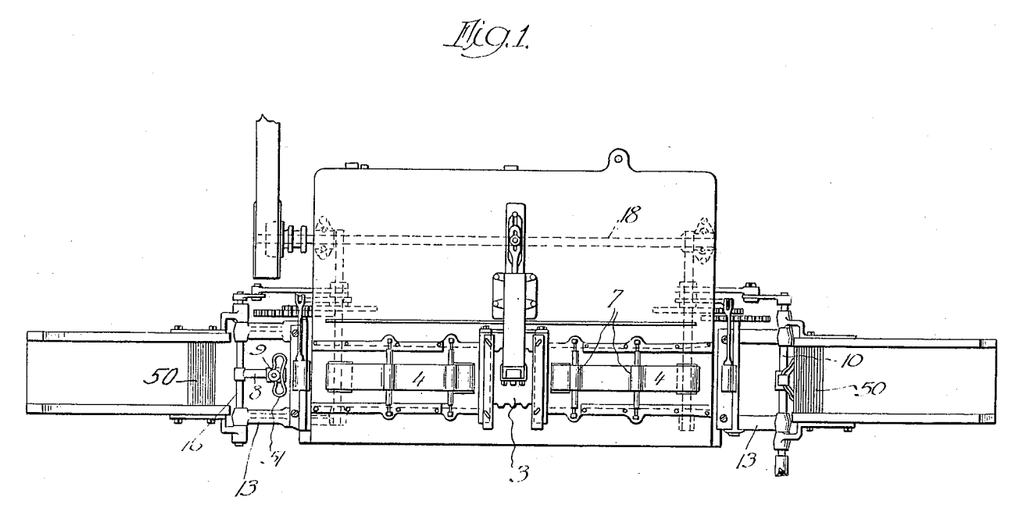
Figure 1 is a plan view of a machine requiring that sheets be fed thereto singly and in order, the sheet feeding mechanism being on the opposite ends of the table.
Figure 7:
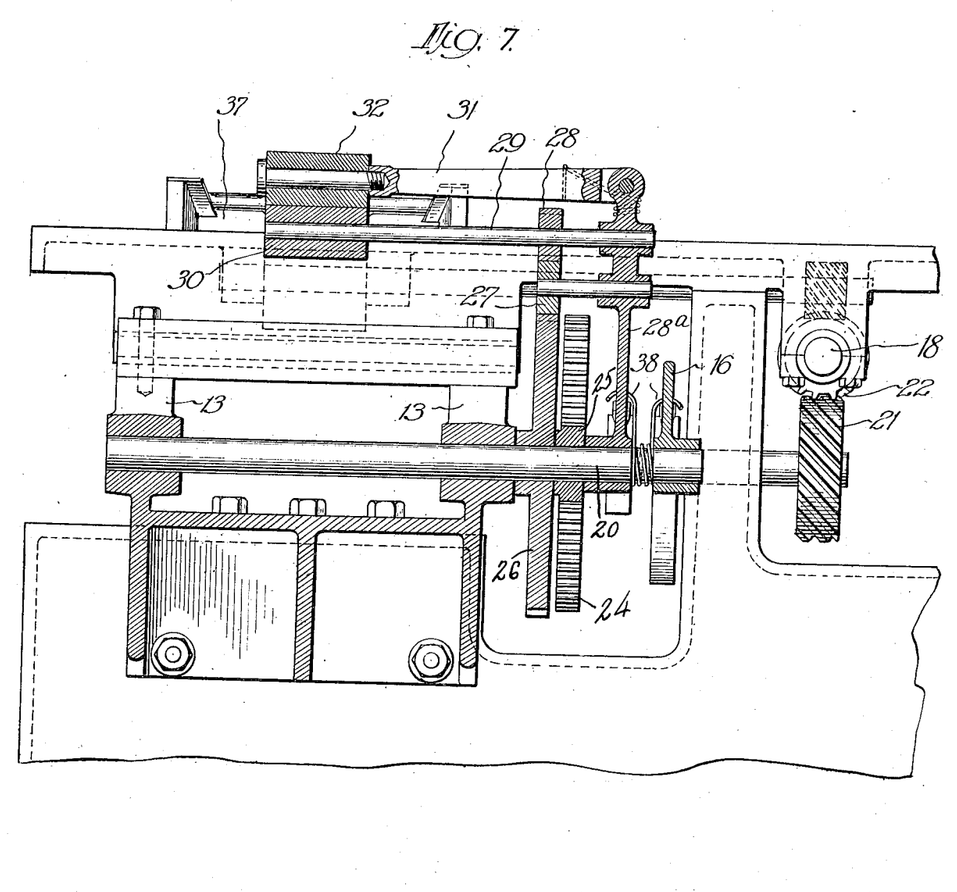
Fig. 7 is a detail of the feed rollers and means of operating the same.

As will be understood from Fig. 1, power is applied to the machine through the main shaft 18 and, as will be understood more clearly from Figs. 1 and 7, power is applied to each feeding mechanism by means of a cross shaft 19 and 20 through a pair of spiral bevel gears 21 on the drive shaft and main shaft respectively. As will be understood more clearly from Fig. 5 the shaft 20 for one feeding mechanism is provided with a spiral gear 21 on the rear end thereof meshing with the intermediate spiral gear 22 which in turn meshes with a similar gear on the belt wheel shaft 23 by means of which the feed belts 4 are driven at the desired rate of speed. The shaft 20 is also provided with a spur gear 24 of comparatively large diameter meshing with a small gear 25 on the shaft 17 and on this shaft is also secured a spur gear 26 of large diameter meshing with an idle gear 27 carried on a rock arm 28a loosely mounted on the shaft 17. This idle gear 27 meshes with a similar small gear 28 secured to a shaft 29 of the lower feed roller 30, as will be understood from Fig. 7. The gear 27 and the feed roller 30, shaft 29 and gear 28 therefor, are mounted on the rock arm 28. On the upper end of the rock arm 28a is a pivoted arm 31 and through the train of gearing described the feed rollers are driven at a very high rate of speed. The rock arm 16 is provided with a rearwardly extending portion 33 having a hardened face or plate adapted to be contacted by a cam 34 secured to the shaft 20. Thus once during each revolution of the shaft 20 the rock arm 16 is rocked on the shaft 17 and by reason of its yoke connection with the shaft 10 with which the arm 8 and apertured suction plate 9 are secured, the said arm 8 is made to occupy the position shown in full lines in Fig. 5 with the envelop or sheet brought horizontally in alinement with the two rollers 30 and 32.

On the shaft 20 is also a cam 35 adapted to contact an end 36 of the rock arm 28a carrying the feed rollers and by means of this cam 35 which it will be noted acts subsequently to the cam 34 on the end 33 of the arm, the rollers are moved to engage a projecting end of the removed sheet carried by the suction plate 9 and arm 8 and, on engagement therewith and due to the rapidity of revolution of the rollers the sheet is stripped from the suction plate and projected into the mouth of the receiving tube or channel 37 located on the table 1 and likewise on the opposite end of the apparatus on the table 2. As will be seen from Fig. 7 both the rock arms 16 and 28a are held by similar springs 38 forcing them to normal position each actuated by the cam members as stated so that these arms are rocked in one direction by the cams in timed relation with the movements of other parts of the mechanism and are returned or moved in the opposite direction by means of a spring.

Figure 2:
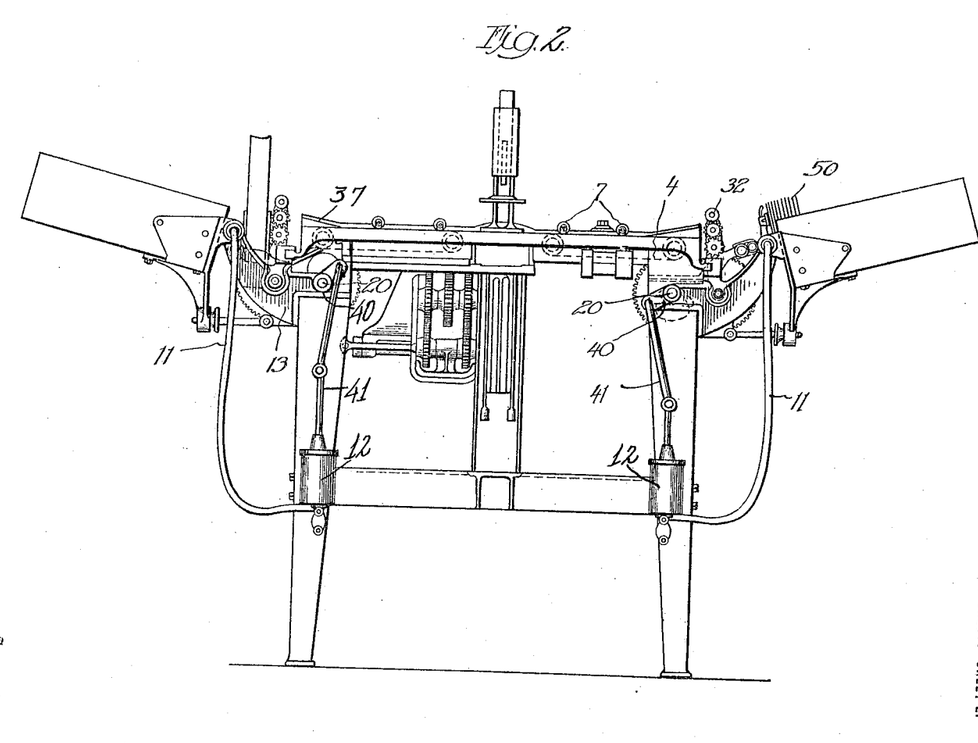
Fig. 2 is a front elevation thereof.
Figure 3:
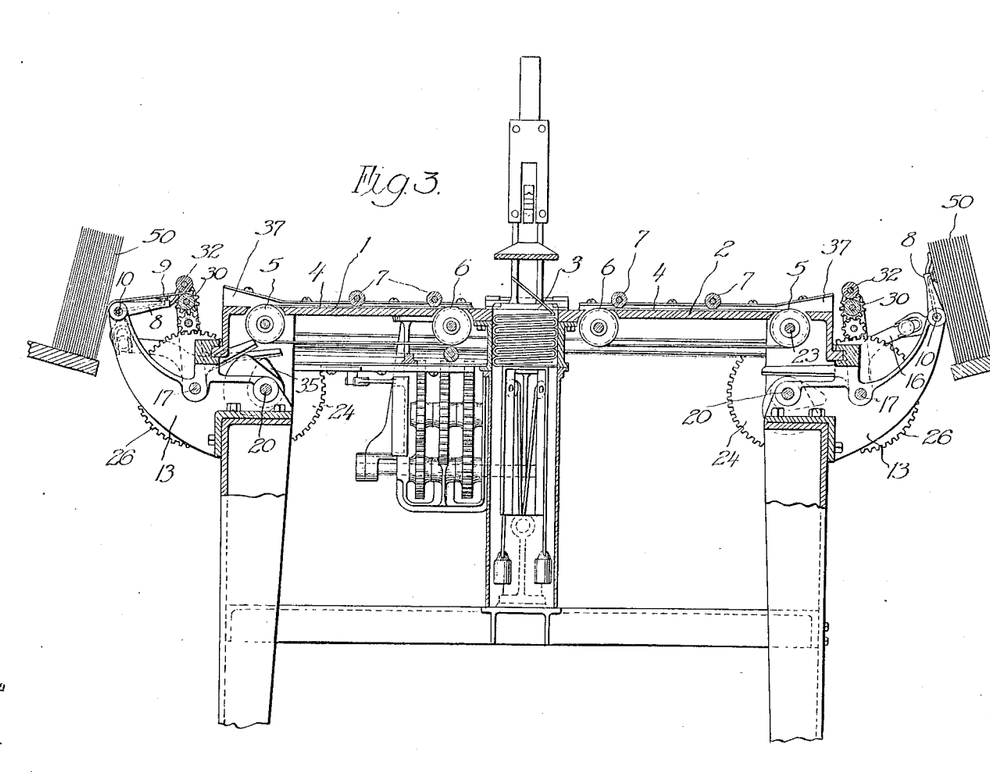
Fig. 3 is a longitudinal section of the folding machine showing the sheet feeding mechanism in section on an enlarged scale.
Figure 5:
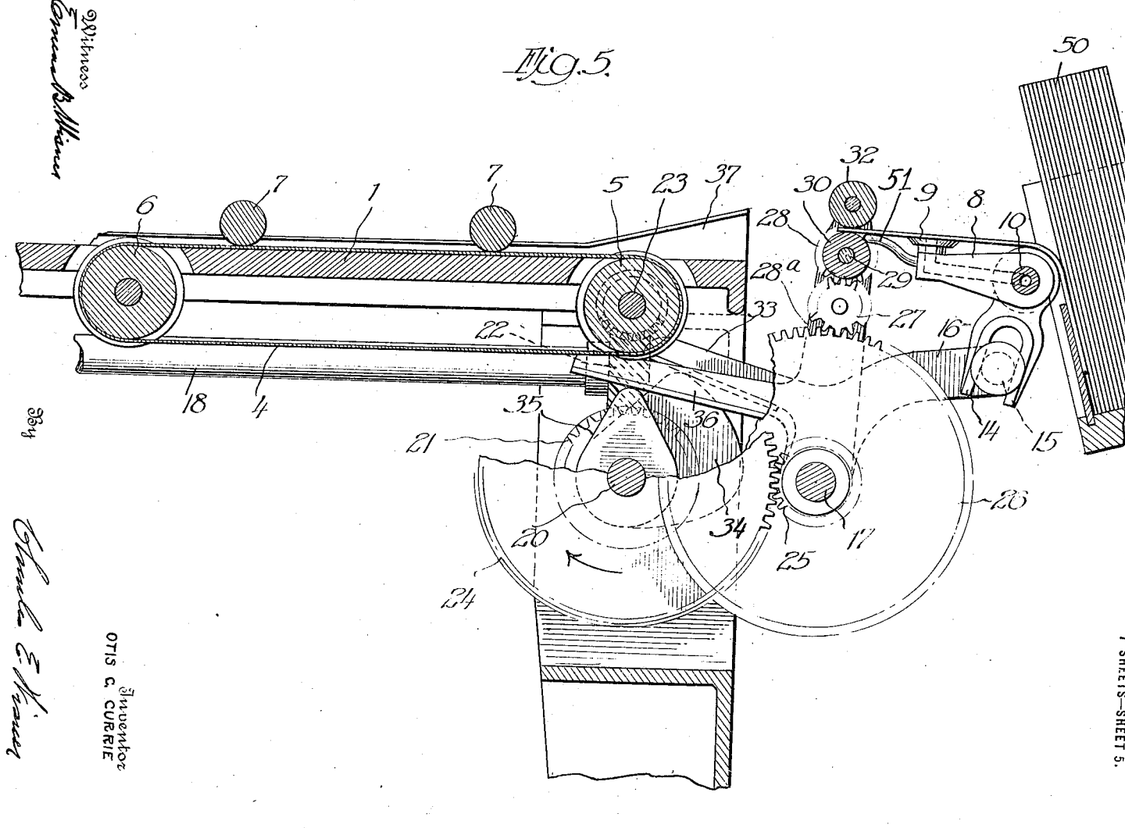
Fig. 5 is a similar view showing the separated sheet being taken up by the feed rollers.

As may be seen in Fig. 2 on the shaft 20 is a crank arm 40 connected by means of a pitman 41 with a pump 12 there being a pump by each end of the machine, as will be understood from Fig. 1 so at each revolution of the shaft 20 the pump is exhausted of air. This pump is connected at the lower end by means of a tube 11 with the hollow end of a shaft 10 and is thus in communication with a suction plate 9 and, at the time the suction plate 9 is brought in connection with the lower end of a stack as shown at the right of Fig. 2 the air is exhausted thus holding the foremost sheet of a pack in contact with the suction plate and upon rotation of the shaft 10 in the manner described the upper end of the sheet is drawn outward as indicated in Fig. 5 and the cams and other mechanism are so timed to operate that as the rolls are moved forward to clasp the free end of the removed sheet the crank has passed its uppermost point of movement thus releasing the pressure on the sheet and allowing the rolls to strip it from the plate and from the stack as will be readily understood.

As shown at the right side of Fig. 2, when the suction plate contacts a sheet the crank arm has passed upward from its lowermost point on the exhaust stroke. Therefore, air has begun to be drawn through the arm prior to its contact with the sheet to be removed. At the left side of the said figure the parts which operate in alternate relation with those on the right side have assumed a relationship in which the rollers are positioned to grasp the end of the removed sheet. Due to this position of the crank arm 40 on that side of the machine the pump at this time is on its pressure stroke in which air is forced through the suction plate releasing the sheet therefrom just prior to the engagement of the feed rolls therewith.

What I have called the receiving tube 37 consists of a sheet of metal of channel shape in cross section positioned on opposite sides of the runway for the sheets and with the open sides of the channel facing each other. The channel thus simply guides the end of the sheets when discharged thereinto by the feed rollers. It will be noted that when discharging the sheet into the runway provided and as above specified the forward end of the sheet is introduced beneath a roller 7 near the receiving end of the runway, which roller is positioned a distance from the feed rollers slightly less than the length of the sheet. There is, therefore, a positive movement of the sheet or envelop down the runway at all times, the rolls 7 being rotatable by movement of the belt on which it rests and as the sheet leaves this roller 7 it will have been engaged by the two rollers near the opposite ends of the runway, and by movement of the belt and this second roller 7 the sheet is positioned over the receiver 3 at the center of the machine.

It is to be understood that the particular feeding mechanism described may be used with any apparatus or mechanism with which it may be adapted to coöperate. The particular instance here given being shown only as the indication of the possible use of the feeding device and it is readily understandable by those skilled in this art that the sheet may be delivered into any particular mechanism, as may be found desirable.

The sheets or envelops as the case may be, which it is desired to feed to position are necessarily formed in the stack 50 and preferably carried in such manner that the stack will feed toward the removing suction plate by gravity although other mechanism may be employed to hold the stack in position to be contacted at the bottom thereof by the suction plate after the manner herein described.

Figure 4:
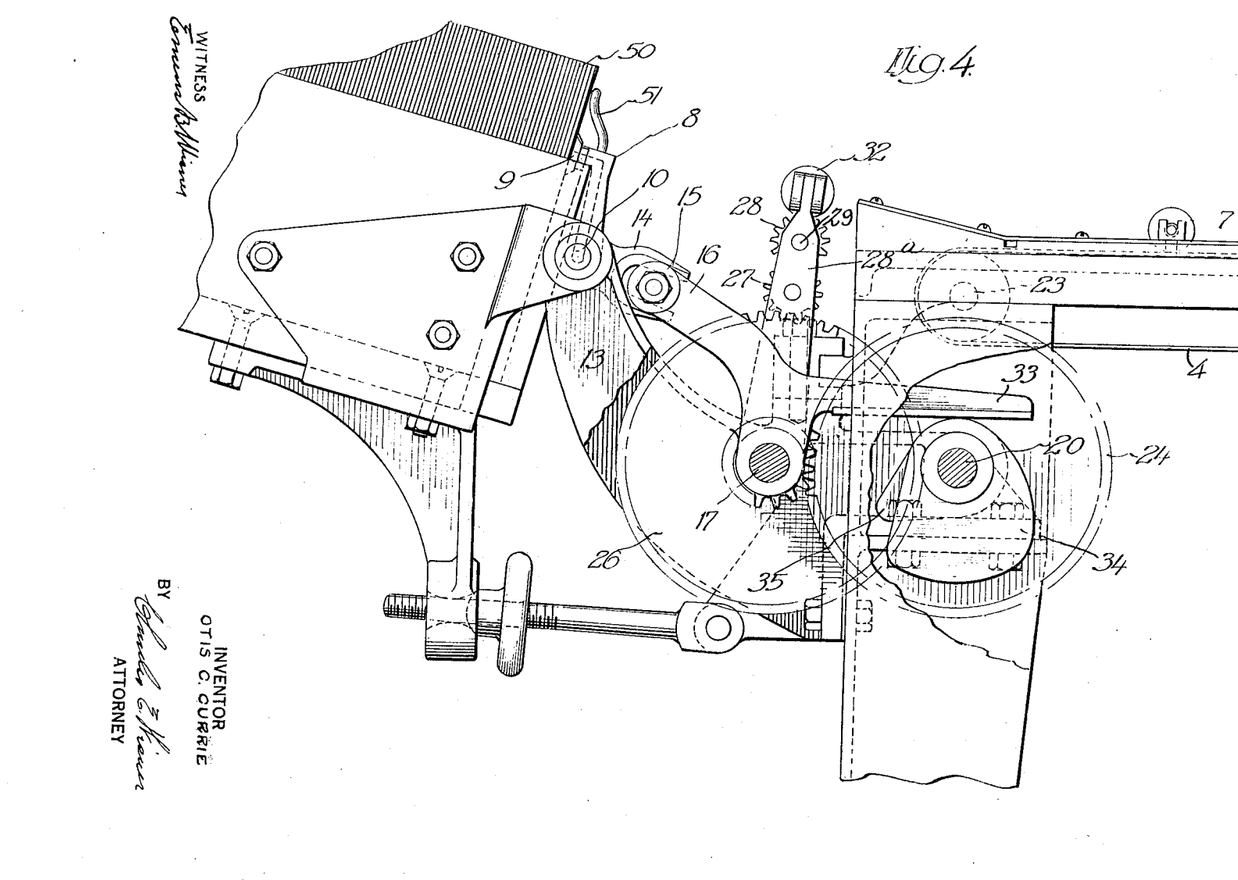
Fig. 4 is an enlarged view in section showing a mechanism in position to separate a sheet from the stack.
Figure 6:
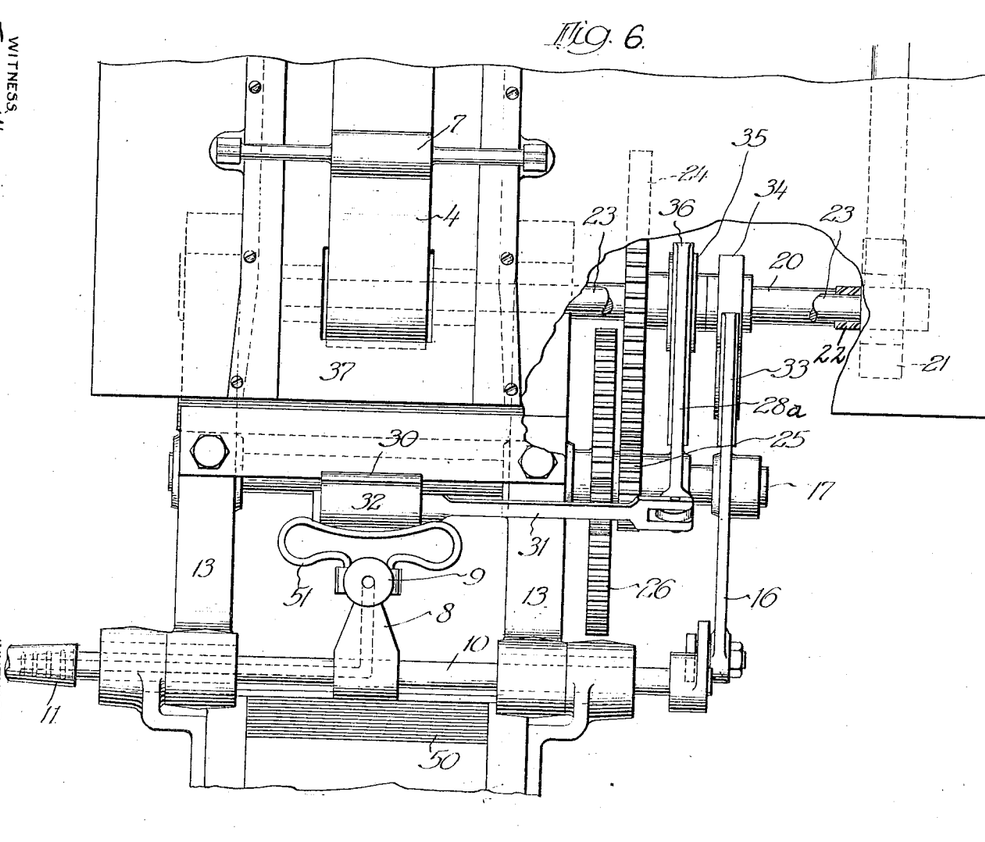
Fig. 6 is a detail of an elevation of a device utilized in separating a sheet from a stack.

In operation it is desired to hold the sheets flat in order that a surface of the sheet or envelop may be perfectly contacted by the suction plate 9 and I have, therefore, provided the plate with a spreader device 51 indicated clearly in Fig. 6 that is of the nature of a spring wire and shaped to engage across the face of the sheet to be removed, as will be understood from Fig. 4 so that during the contact of the plate with the sheet it is held substantially flat. It is also to be noted that by drawing the sheet or envelop to the suction plate by vacuum that a single sheet only will be removed from the stack at a time, the remaining sheets not being under influence of the vacuum produced, therefore, the device is very accurate in operation and very useful wherever it is found necessary and desirable that only a single sheet should be removed at a time as with the interfolding mechanism described in my said pending application (Serial Number 120,705).

From the foregoing description it will be evident to those familiar with this art, that the device is comparatively simple and inexpensive, is very accurate and efficient in operation, and of a character in which the liability of disarrangement of parts is reduced to a minimum.

Having thus briefly described my invention, its utility and mode of operation, what I claim and desire to secure by Letters Patent of the United States is—

1. In a machine for feeding sheets, envelops and the like, means for holding a stack of sheets or envelops, and means for removing a single sheet or envelop at a time from the stack consisting of a suction plate adapted to be brought into engagement with the upper end of the sheet and to turn the same to substantially horizontal position, a pair of rotating feed rollers oscillatable to be moved toward and from the suction plate, the construction being such that the sheet is held by the suction plate until engaged by the rollers.

2. In mechanism for feeding sheets, envelops and the like, means for holding a stack of sheets or envelops, and means for removing a single sheet or envelop at a time from the stack consisting of an oscillatory suction plate adapted to be brought into contact wtih the foremost sheet of the stack at the upper end and to turn the same outward from the stack, a pair of rotatable feed rollers, means for oscillating the same toward and from the end of the removed sheet, and means for releasing the sheet from the suction plate at the time it is engaged by the feed rolls.

3. In mechanism for feeding sheets, envelops and the like, means for holding a stack of sheets or envelops with the upper ends thereof relatively unsupported and freely movable, a suction plate adapted to be brought from the stack to engage the upper end of the foremost sheet and turn the same to substantially horizontal position with the suction plate on the under side of the sheet, feed rolls adapted to remove the sheet from the plate, and means for releasing the sheet from the suction plate at the time of its engagement by the feed rolls.

4. In mechanism for feeding sheets, envelops and the like, means for holding a stack of sheets or envelops, a suction plate, a hollow arm supporting the plate, means for oscillating the said arm to bring the plate to and from the stack to turn an end of the foremost sheet outward from the stack with the suction plate therebeneath providing a table for the sheet, a pair of continuously rotatable feed rolls, a frame supporting the rolls oscillatable in timed relation with the oscillation of the suction plate and its supporting arm to place the rolls in position to grasp the end of the sheet, means for releasing the sheet from the suction plate at the time it is grasped by the feed rolls, and a receiver to which the sheet is delivered by the rolls.

5. In mechanism of the character described including means for holding a stack of sheets, means for removing a single sheet at the time therefrom consisting of an oscillatory suction plate adapted to engage the stack and withdraw an end of the foremost sheet therefrom, a yieldable spreader device carried with the plate and adapted to engage the sheet to maintain the same substantially flat, and means for oscillating the plate and turn the end of the engaged sheet outward from the stack, the spreader and suction plate providing a support for the end sheet when withdrawn from the stack, a pair of oscillatory feed rolls adapted to move toward and from the stack to grasp the end of the supported sheet and remove the same from the support.

6. In apparatus of the character described, a conveyer for supporting a stack of sheets down which they are adapted to feed by gravity, the conveyer being pivotally supported and adjustable to incline the conveyer and hold the sheets or envelops at an angle forward of the vertical, a suction plate adapted to be brought into contact with the forward sheet near the top and withdraw the same therefrom, the plate providing a support for the end of the sheet and adapted to hold the same flat, a pair of oscillatory rotating feed rolls adapted to be brought toward and from the suction plate to grasp the edge of the sheet supported thereby, and means for releasing the sheet from the suction plate practically at the time of engagement of the feed rolls therewith.

7. In mechanism of the character described, means for holding a stack of sheets or envelops, an oscillatory suction plate adapted to engage the bottom sheet of the stack and withdraw an end thereof forward and downward to substantially horizontal position, the plate providing a retainer for the sheet, a pair of horizontally positioned rotatable rollers adapted to oscillate toward and from the suction plate to grasp the end of the sheet held thereby, the sheet being released from the plate at the time of grasping thereof by the rollers.

In testimony whereof, I sign this specification.

OTIS C. CURRIE.